US012795495B2

(12) United States Patent
Mahadevan et al.

(10) Patent No.: US 12,795,495 B2
(45) Date of Patent: Nov. 10, 2026

(54) LOCATION BASED CONTROL PLANE SIGNALING AND PROACTIVE TRANSPORT SWITCHING FOR SDWAN

(71) Applicant: Cisco Technology, Inc., San Jose, CA (US)

(72) Inventors: Satish Kumar Mahadevan, San Ramon, CA (US); Sanjay Sreenath, San Jose, CA (US); Balaji Sundararajan, Fremont, CA (US); Manish Mehra, Los Altos, CA (US); Sharmishtha Upadhyay, Fremont, CA (US); Sourav Sen, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 273 days.

(21) Appl. No.: 18/792,344

(22) Filed: Aug. 1, 2024

(65) Prior Publication Data

US 2026/0040180 A1 Feb. 5, 2026

(51) Int. Cl.

*H04W 36/32* (2009.01)
*H04W 36/02* (2009.01)
*H04W 36/08* (2009.01)

(52) U.S. Cl.

CPC ......... *H04W 36/322* (2023.05); *H04W 36/02* (2013.01); *H04W 36/08* (2013.01)

(58) Field of Classification Search

CPC ... H04W 36/322; H04W 36/02; H04W 36/08; H04W 36/00838; H04W 36/324; H04W 40/20; H04L 41/0894

USPC ........................................................ 455/436

See application file for complete search history.

(56) References Cited

U.S. PATENT DOCUMENTS

| | | | | |
|---|---|---|---|---|
| 11,223,538 | B1 * | 1/2022 | Arumugam | H04L 41/0803 |
| 12,445,373 | B2 * | 10/2025 | Vysotsky | H04L 45/02 |
| 12,483,495 | B1 * | 11/2025 | Henkel | H04L 45/04 |
| 2021/0022065 | A1 * | 1/2021 | Maria | H04L 12/46 |
| 2022/0322206 | A1 | 10/2022 | Catalli et al. | |
| 2022/0368643 | A1 | 11/2022 | Momchilov et al. | |

(Continued)

OTHER PUBLICATIONS

MD Samiul Islam et al. (A Survey On SDN & SDCN Traffic Measurement: Existing Approaches and Research Challenge; IEEE, 2022) (Year: 2022).*

(Continued)

*Primary Examiner* — Hirdepal Singh

(74) *Attorney, Agent, or Firm* — Polsinelli P.C.

(57) ABSTRACT

In some aspects, a method for managing policies on a mobile client device within a Software-Defined Wide Area Network (SD-WAN) is disclosed. The method can include receiving, at a controller, a policy based on knowledge of a route the mobile client device. The controller transmits this policy to the mobile client device. The policy specifies the transition to base stations in the policy area to provide connectivity for the mobile client device based on its position along the route. As the mobile client device enters a policy area defined by the received policy, it signals its entry to the controller. In response to a request, the buffer is increased upon its entry into the policy area. Once the mobile client device is predicted to exit the policy area, it is prompted to resume normal operation. If normal operation is not detected, the system smoothly transitions into a GR mode.

20 Claims, 5 Drawing Sheets

(56) References Cited

U.S. PATENT DOCUMENTS

| | | | | |
|---|---|---|---|---|
| 2023/0134539 | A1* | 5/2023 | Wang | H04L 41/0893 709/223 |
| 2023/0224331 | A1* | 7/2023 | Mashargah | H04L 63/166 726/3 |
| 2023/0231768 | A1 | 7/2023 | Vysotsky et al. | |
| 2023/0261945 | A1 | 8/2023 | Wang et al. | |
| 2023/0262525 | A1 | 8/2023 | Pularikkal et al. | |
| 2025/0112858 | A1* | 4/2025 | Ikuno | H04L 45/308 |

OTHER PUBLICATIONS

Cisco: "Software-Defined Access Solution Design Guide", Cisco Public, Jun. 2020, pp. 1-112.

* cited by examiner

LOCATION BASED CONTROL PLANE SIGNALING AND PROACTIVE TRANSPORT SWITCHING FOR SDWAN

FIELD OF THE TECHNOLOGY

The present technology relates to the field of network communication and routing technologies, specifically addressing methods for policy and location-based router transitions across multiple base stations.

BACKGROUND

In a mobile environment, the SD-WAN edge router plays a crucial role in providing reliable and secure connectivity. It employs advanced technologies such as software-defined networking (SDN), virtualization, and dynamic path selection algorithms to adapt to changing network conditions. Through virtualization, virtual instances of network functions can be created, enabling flexible deployment and scaling. The router uses dynamic path selection to intelligently route traffic over the most optimal path based on real-time performance metrics such as latency, packet loss, and cost. Quality of Service (QoS) mechanisms prioritize critical traffic types to ensure consistent performance for essential applications. Additionally, the router comes with robust security features, including encryption and intrusion detection/prevention, to protect data transmitted over cellular connections, mitigating risks associated with potential vulnerabilities. Continuous monitoring and analytics capabilities enable proactive issue detection and network optimization, ensuring uninterrupted connectivity and a seamless user experience in mobile environments.

BRIEF DESCRIPTION OF THE SEVERAL VIEWS OF THE DRAWINGS

In order to describe the manner in which the above-recited and other advantages and features of the disclosure may be obtained, a more particular description of the principles briefly described above will be rendered by reference to specific embodiments thereof which are illustrated in the appended drawings. Understanding that these drawings depict exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
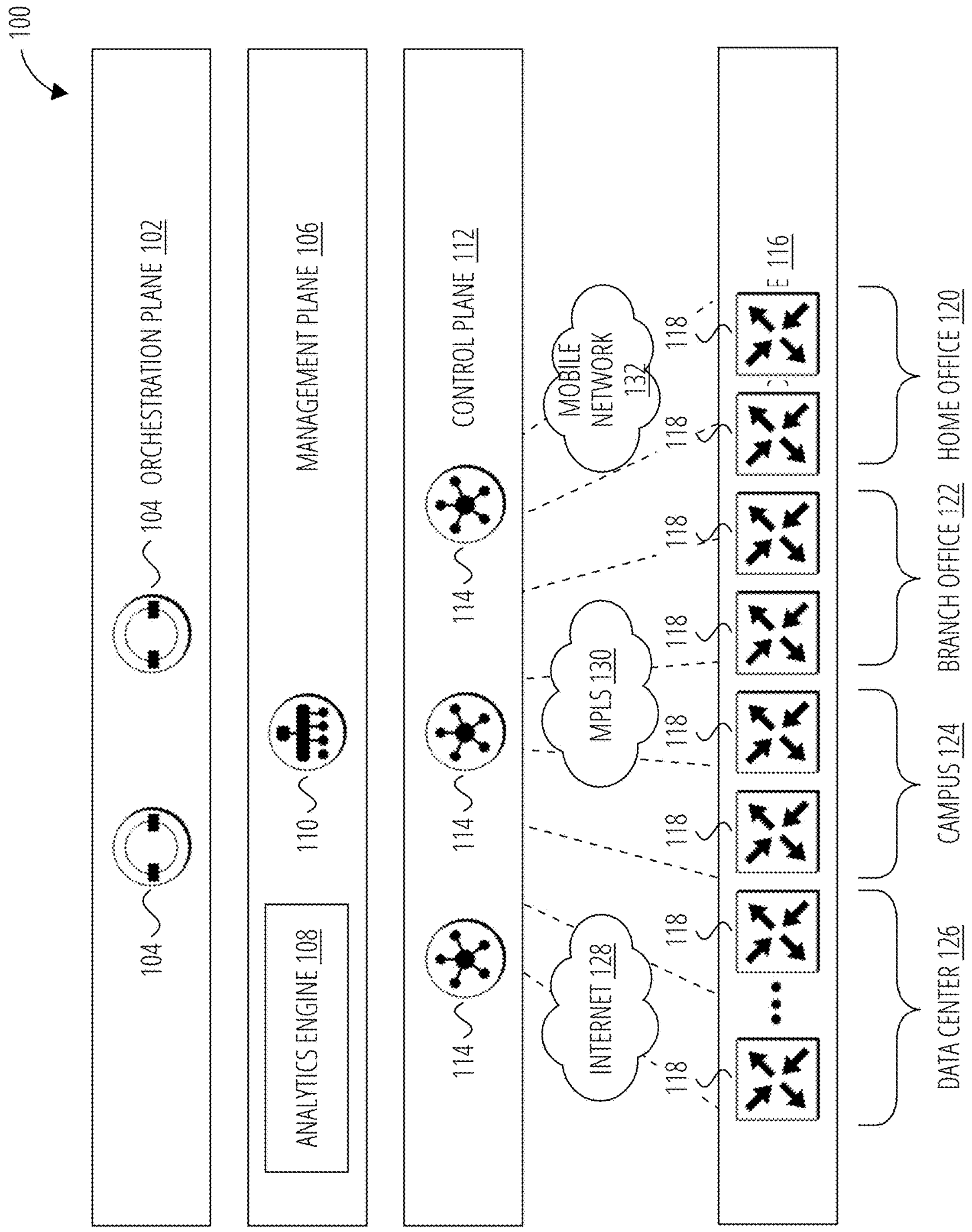
FIG. 1 illustrates an example of a high-level network architecture in accordance with some examples of the disclosure.

Various examples of the disclosure are discussed in detail below. While specific implementations are discussed, it should be understood that this is done for illustration purposes. A person skilled in the relevant art will recognize that other components and configurations can be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an example in the present disclosure can be references to the same example or any example; and, such references mean at least one of the examples.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which can be exhibited by some embodiments and not by others.

The terms used in this specification generally have their ordinary meanings in the art, within the context of the disclosure, and in the specific context where each term is used. Alternative language and synonyms can be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative, and is not intended to further limit the scope and meaning of the disclosure or of any example term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles can be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

OVERVIEW

Software-Defined Wide Area Networking (SD-WAN) represents a transformative approach to networking that leverages software-defined networking (SDN) principles to enhance the management and operation of wide-area networks. At its core, SD-WAN decouples networking hardware from its control mechanism, enabling centralized control and orchestration of network traffic flows across geographically dispersed locations. This paradigm shift allows organizations to efficiently connect their branch offices, data centers, and cloud resources while optimizing performance, reliability, and security.

SD-WAN technology works by dynamically directing network traffic across various pathways, including MPLS, broadband Internet, and cellular connections, based on real-time conditions and application requirements. Through centralized management and policy-based routing, SD-WAN controllers intelligently route traffic to ensure optimal performance and reliability. Moreover, SD-WAN offers enhanced visibility and control over network traffic, allowing administrators to monitor performance metrics and quickly respond to changing network conditions. By leveraging automation and analytics, SD-WAN enables proactive network management, reducing manual intervention and improving operational efficiency. Additionally, SD-WAN solutions often incorporate advanced security features, such as encryption, firewalling, and intrusion prevention, to safeguard data transmitted over the network and mitigate security threats.

In some scenarios, an SD-WAN edge router may be deployed in environments where it is not stationery and experiences frequent movement. Examples include installation on long-distance trains, buses, emergency vehicles, recreational vehicles, and similar mobile vehicles that could be subjected to various network connectivity. In such cases, the SD-WAN router depends on cellular connections when mobile on one or more of the previously mentioned modes of transportation, which presents two main challenges. Firstly, the router's mobility necessitates transitioning between various cellular base stations. Typically, this shift occurs reactively, causing the router to lose connectivity with the previous base station before establishing a connection with the new one at its updated location. Consequently, this leads to traffic loss and suboptimal SD-WAN network performance for users.

Additionally, during transient loss of transport connectivity, the router also loses connection to the routing controllers, which triggers a transition into graceful recovery (GR) mode. Upon regaining connectivity, the router must re-establish communication with the routing controller, often necessitating the re-downloading of all routing information. This process is not only costly but also consumes valuable cellular bandwidth.

To address these challenges within the specific context of SD-WAN networks, this disclosure proposes solutions aimed at optimizing the router's performance and minimizing disruptions caused by mobility and transient connectivity losses.

In one proposed solution, the disclosure discloses policy and location-based router transitions for a mobile client device across cellular base stations. The SD-WAN network operator possesses knowledge regarding the travel route of the mobile SD-WAN router, for instance, one placed on trains following fixed routes. Additionally, the locations of cellular base-station transitions are well-established, determined by the placement of these stations along the travel path of the mobile SD-WAN router. This enables the SD-WAN network operator to establish a policy defining the match condition as location (GPS coordinates) and specifying the action as a proactive and forced cutover to a more optimal cellular base station. Beneficially, this approach minimizes outages or impacts to users of the SD-WAN network, as the mobile router anticipates connectivity issues during the cutover process and proactively resolves them before they affect applications.

In another proposed solution, the disclosure discloses policy based optimizations of control plane GR for mobility scenarios. In some cases, coverage dead spots may still exist along the travel path of the SD-WAN router, resulting in temporary disruptions to connectivity. Typically, the duration of these connectivity interruptions lasts a few seconds to a few minutes. To mitigate potential control-plane disruptions on the device and routing controllers, the location-match policy outlined in the preceding section can be enhanced to include a control-plane-tolerance interval. The control-plane-tolerance interval informs the routing controller that, when the mobile router anticipates encountering connectivity issues at specific locations, a temporarily extended timeout is often required. The timeout duration is determined by the location-match-based policy applied to the mobile SD-WAN router. By temporarily increasing the tolerance level, the control connections to the routing controller remain active, preventing them from being terminated. Moreover, the routing protocol adjusts its protocol-hello tolerance accordingly. This approach ensures the continuity of the routing protocol session with the routing controller, preventing it from transitioning into GR mode, and routing re-convergence processes are avoided.

Disclosed are systems, apparatuses, methods, computer readable medium, and circuits for managing policies on a mobile client device within a SD-WAN. The disclosed systems and techniques can reduce errors by providing policy-and-location-based router transitions across cellular base stations in communication with a mobile client device.

According to at least one aspect, the techniques described herein relate to a method for managing policies on a mobile client device within a Software-Defined Wide Area Network (SD-WAN), the method including: receiving, at a controller, a policy based on knowledge of a route the mobile client device; transmitting, by the controller, the policy to the mobile client device; receiving, from the mobile client device, an indication that the mobile client device has entered a policy area defined by the policy; in response to receiving a request from the mobile client device, increasing a buffer upon the mobile client device entering the policy area; prompting the mobile client device to continue normal operation after the mobile client device is predicted to exit the policy area; and entering a GR mode upon determining the normal operation is not detected.

In some aspects, the techniques described herein relate to a method, wherein the policy being received upon detection of movement of the mobile client device.

In some aspects, the techniques described herein relate to a method, wherein a first configuration is selected from one or more location-based configurations based on the policy area.

In some aspects, the techniques described herein relate to a method, wherein the policy includes of one or more location-based configurations for implementation based on a location of the mobile client device along the route.

In some aspects, the techniques described herein relate to a method, wherein the buffer is increased for a predetermined time period based on the implementation of the policy.

In some aspects, the techniques described herein relate to a method, wherein prompting the mobile client device to continue the normal operation occurs at an expiry of the predetermined time period.

In some aspects, the techniques described herein relate to a method, wherein the buffer is increased for a predetermined time and the buffer can be increased if a check of the location maintains a position of the mobile client device as within the policy area.

In some aspects, the techniques described herein relate to a method, wherein the normal operation including continuing one or more operations scheduled prior to initiation of the predetermined time period.

In another aspect, the techniques described herein relate to a method including: receiving from a controller a policy based on knowledge of a route of a mobile client device; determining an entrance into a policy area at a first location defined by the policy received; transmitting a request to the controller, the request including an indication of the entrance into the policy area, the indication triggering the controller to increase a buffer and trigger a timer for a predetermined time period; monitoring for a prompt from the controller upon expiry of the timer, the prompt including a trigger to continue normal operation based on a prediction by the controller that the mobile client device has reached a second location indicating an exit from the policy area; and in response to a delay in receiving the prompt to continue the normal operation, entering a GR mode until the prompt is received from the controller.

In some aspects, the techniques described herein relate to a method, wherein the policy being received upon detection of movement of the mobile client device.

In some aspects, the techniques described herein relate to a method, wherein a first configuration is selected from a one or more location-based configurations based on the policy area.

In some aspects, the techniques described herein relate to a method, wherein the policy includes of one or more location-based configurations for implementation based on a location of the mobile client device along the route.

In some aspects, the techniques described herein relate to a method, wherein the buffer is increased for the predetermined time period based on the implementation of the policy.

In some aspects, the techniques described herein relate to a method, wherein prompting the mobile client device to continue the normal operation occurs at the expiry of the predetermined time period.

In some aspects, the techniques described herein relate to a method, wherein the buffer is increased for a predetermined time and the buffer can be increased if a check of the location maintains a position of the mobile client device as within the policy area.

In some aspects, the techniques described herein relate to a method, wherein the normal operation including continuing one or more operations scheduled prior to initiation of the predetermined time period.

In another aspect, the techniques described herein relate to a non-transitory computer-readable medium including computer-readable instructions, which when executed by one or more processors of a network appliance, cause the network appliance to: receiving, at a controller, a policy based on knowledge of a route of a mobile client device; transmitting, by the controller, the policy to the mobile client device; receiving, from the mobile client device, an indication that the mobile client device has entered a policy area defined by the policy; in response to receiving a request from the mobile client device, increasing a buffer upon the mobile client device entering the policy area; prompting the mobile client device to continue normal operation after the mobile client device is predicted to exit the policy area; and entering a GR mode upon determining the normal operation is not detected.

EXAMPLE EMBODIMENTS

Additional features and advantages of the disclosure will be set forth in the description that follows, and in part, will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

FIG. 1 illustrates an example of a network architecture 100 for implementing aspects of the present technology. An example of an implementation of the network architecture 100 is the Cisco® SD-WAN architecture. However, one of ordinary skill in the art will understand that, for the network architecture 100 and any other system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure.

In this example, the network architecture 100 can comprise an orchestration plane 102, a management plane 106, a control plane 112, and a data plane 116. The orchestration plane 102 can assist in the automatic on-boarding of edge network device 118 (e.g., switches, routers, etc.) in an overlay network. The orchestration plane 102 can include one or more physical or virtual network orchestrator appliances 104. The network orchestrator appliances 104 can perform the initial authentication of the edge network devices 118 and orchestrate connectivity between devices of the control plane 112 and the data plane 116. In some embodiments, the network orchestrator appliances 104 can also enable communication of devices located behind Network Address Translation (NAT). In some embodiments, physical or virtual Cisco® SD-WAN vBond appliances can operate as the network orchestrator appliances 104.

The management plane 106 can be responsible for central configuration and monitoring of a network. The management plane 106 can include one or more physical or virtual network management appliances 110 and an analytics engine 108. In some embodiments, the network management appliances 110 can provide centralized management of the network via a graphical user interface to enable a user to monitor, configure, and maintain the edge network devices 118 and links (e.g., Internet transport network 128, MPLS network 130, 4G/mobile network 132) in an underlay and overlay network. The network management appliances 110 can support multi-tenancy and enable centralized management of logically isolated networks associated with different entities (e.g., enterprises, divisions within enterprises, groups within divisions, etc.). Alternatively, or in addition, the network management appliance 110 can be a dedicated network management system for a single entity. In some embodiments, physical or virtual Cisco® SD-WAN Manage appliances can operate as the network management appliances 110.

The control plane 112 can build and maintain a network topology and make decisions on where traffic flows. The control plane 112 can include one or more physical or virtual network control appliances 114. The network control appliances 114 can establish secure connections to each edge network device 118 and distribute route and policy information via a control plane protocol (e.g., Overlay Management Protocol (OMP) (discussed in further detail below), Open Shortest Path First (OSPF), Intermediate System to Intermediate System (IS-IS), Border Gateway Protocol (BGP), Protocol-Independent Multicast (PIM), Internet Group Management Protocol (IGMP), Internet Control Message Protocol (ICMP), Address Resolution Protocol (ARP), Bidirectional Forwarding Detection (BFD), Link Aggregation Control Protocol (LACP), etc.). In some embodiments, the network control appliances 114 can operate as route reflectors. The network control appliances 114 can also orchestrate secure connectivity in the data plane 116 between and among the edge network devices 118. For example, in some embodiments, the network control appliances 114 can distribute crypto key information among the edge network devices 118. This can allow the network to support a secure network protocol or application (e.g., Internet Protocol Security (IPSec), Transport Layer Security (TLS), Secure Shell (SSH), etc.) without Internet Key Exchange (IKE) and enable scalability of the network. In some embodiments, physical or virtual Cisco® SD-WAN vSmart controllers can operate as the network control appliances 114.

The data plane 116 can be responsible for forwarding packets based on decisions from the control plane 112. The data plane 116 can include the edge network devices 118, which can be physical or virtual edge network devices. The edge network devices 118 can operate at the edges various network environments of an organization, such as in one or more data centers 126, campus networks 124, branch office networks 122, home office networks 120, and so forth, or in the cloud (e.g., Infrastructure as a Service (IaaS), Platform as a Service (PaaS), SaaS, and other cloud service provider networks). The edge network devices 118 can provide secure data plane connectivity among sites over one or more WAN transports, such as via one or more internet transport networks 128 (e.g., Digital Subscriber Line (DSL), cable, etc.), MPLS networks 130 (or other private packet-switched network (e.g., Metro Ethernet, Frame Relay, Asynchronous Transfer Mode (ATM), etc.), mobile networks 132 (e.g., 3G, 4G/LTE, 5G, etc.), or other WAN technology (e.g., Synchronous Optical Networking (SONET), Synchronous Digital Hierarchy (SDH), Dense Wavelength Division Multiplexing (DWDM), or other fiber-optic technology; leased lines (e.g., T1/E1, T3/E3, etc.); Public Switched Telephone Network (PSTN), Integrated Services Digital Network (ISDN), or other private circuit-switched network; small aperture terminal (VSAT) or other satellite network; etc.). The edge network devices 118 can be responsible for traffic forwarding, security, encryption, quality of service (QoS), and routing (e.g., BGP, OSPF, etc.), among other tasks. In some embodiments, physical or virtual Cisco® SD-WAN vEdge routers can operate as the edge network devices 118.

Figure 2:
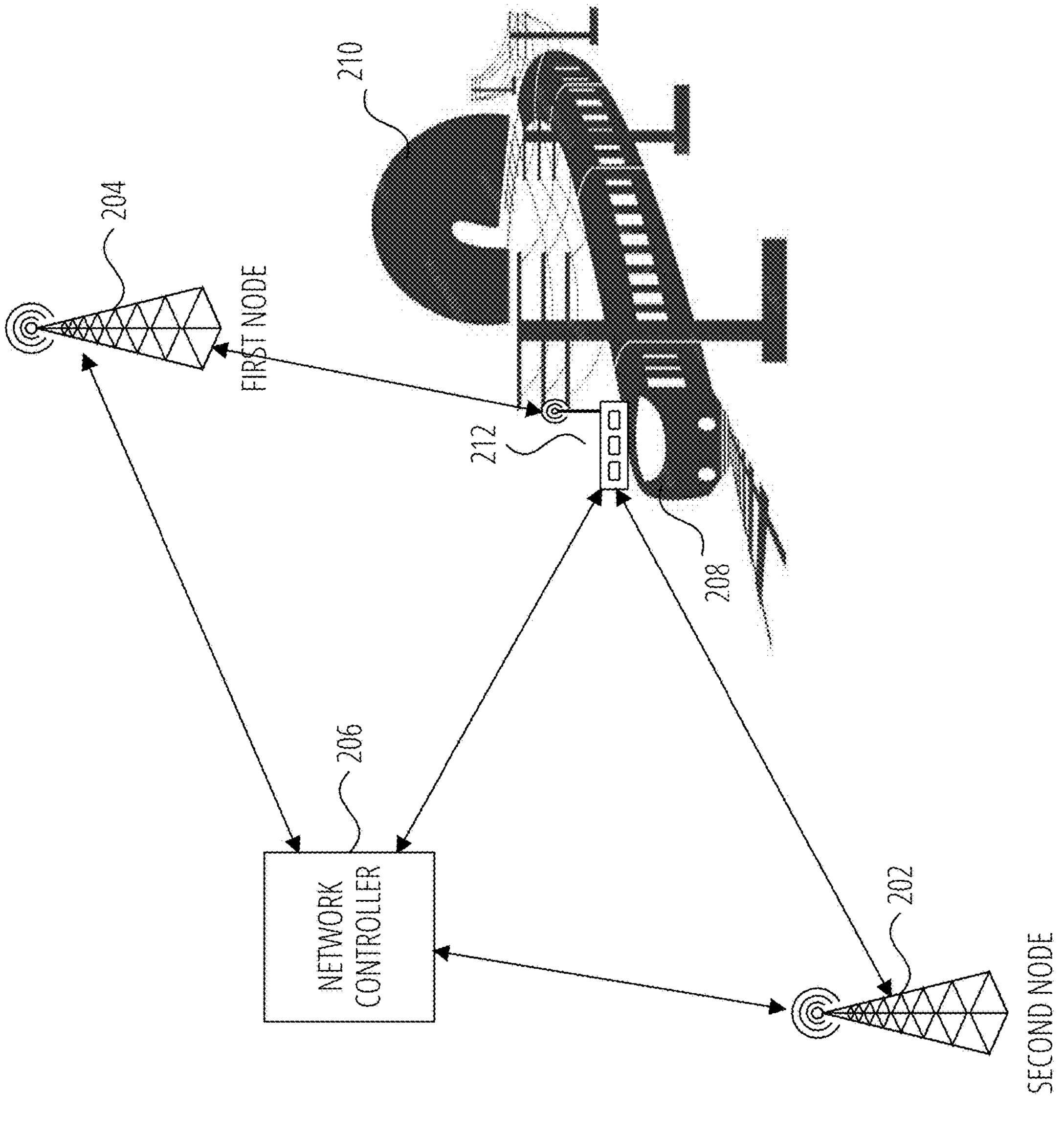
FIG. 2 illustrates a system diagram for a network controller managing policies on a mobile client device within a Software-Defined Wide Area Network (SD-WAN) in accordance with some examples of the disclosure.

FIG. 2 illustrates a system diagram for a network controller managing policies on a mobile client device within a Software-Defined Wide Area Network (SD-WAN) in accordance with some examples of the disclosure.

In certain scenarios, an SDWAN edge router is not in a fixed location and moves a lot. An example is an SDWAN router placed on mobile vehicle 208 such as a long-distance train. And in such cases, the SDWAN router has cellular connections as transport. During mobility of the mobile vehicle, there may be multiple stops that the vehicle may need to take, and multiple portions of a route to reach a specified destination that may have experience poor connectivity and signal capacity in different points of the network. Thus, the mobile client device on the mobile vehicle 208 could experience signal loss causing the connectivity to get dropped at different points along the way to the destination.

To ensure consistent connectivity and prevent untimely disruptions for the mobile client device 212, which frequently transmits vital business data, the Network controller 206 employs a proactive approach. It analyzes the anticipated route of the mobile client device 212 as it travels within the mobile vehicle 208 toward its intended destination. Utilizing this route information, the Network controller 206 configures a network policy tailored to optimize connectivity. This policy delineates the optimal connection points along the route, taking into account the base stations serving the mobile client device 212. Furthermore, the policy establishes transient periods to address potential loss of connectivity at specific connecting points based on GPS coordinates. By preemptively defining these parameters, the Network controller 206 enhances network reliability and minimizes the risk of disconnections for data transmissions.

The policy serves as a set of guidelines for the mobile client device 212 on how to manage periods of connectivity loss when reaching specific locations along its route. For instance, as the mobile vehicle 208 approaches a tunnel 210, which typically disrupts connectivity between the first node 204 and the second node 202, the policy delineates key areas. These areas include the entrance of the policy area before entering the tunnel 210, where connectivity loss is expected, and the exit point after leaving the tunnel 210, where connectivity is likely to resume. This proactive approach ensures that the mobile client device 212 can anticipate and effectively navigate through periods of connectivity disruption, maintaining seamless communication throughout its journey.

Upon entering the policy area, the mobile client device 212 adheres to the policy guidelines. It recognizes that upon reaching the first location within the policy area, a predetermined period of connectivity loss is anticipated. Accordingly, the device sends a notification, as dictated by the policy, to signal its entry into the policy area and requests the network controller 206 to augment a buffer. This action prompts the controller to acknowledge transitions of mobile client device 212 transition into a region of low connectivity. Despite potential disruptions, the controller refrains from initiating a GR mode for a specified duration outlined in the policy. This duration aligns with the estimated time for the mobile client device 212 to reach the second location, indicating an exit from the policy area. Consequently, the network controller 206 avoids prematurely identifying connectivity loss as an abnormality or failure, thereby bypassing restoration procedures and traffic diversion from assumed unstable network paths. Upon the lapse of the designated time period, the controller prompts the mobile client device 212 to resume normal operations seamlessly.

In an example, the network controller 206 might not receive a confirmation from the mobile client device 212 indicating the continuation of normal operations. In accordance with the policy, the network controller 206 may opt to prolong the buffer duration for a second predefined period. Subsequently, it may prompt the mobile client device 212 again, adhering to the guidelines outlined in the policy. If the mobile client device 212 fails to resume normal operations after multiple prompts, as specified by the policy, the network controller 206 initiates GR mode.

Upon receiving an indication that the mobile client device 212 is operating normally, the network controller 206 determines that the mobile vehicle 208 has left the tunnel 210 and is approaching the second location. The network controller 206 then issues instructions for the mobile client device 212 to transmit data through the second node 202.

Figure 3:
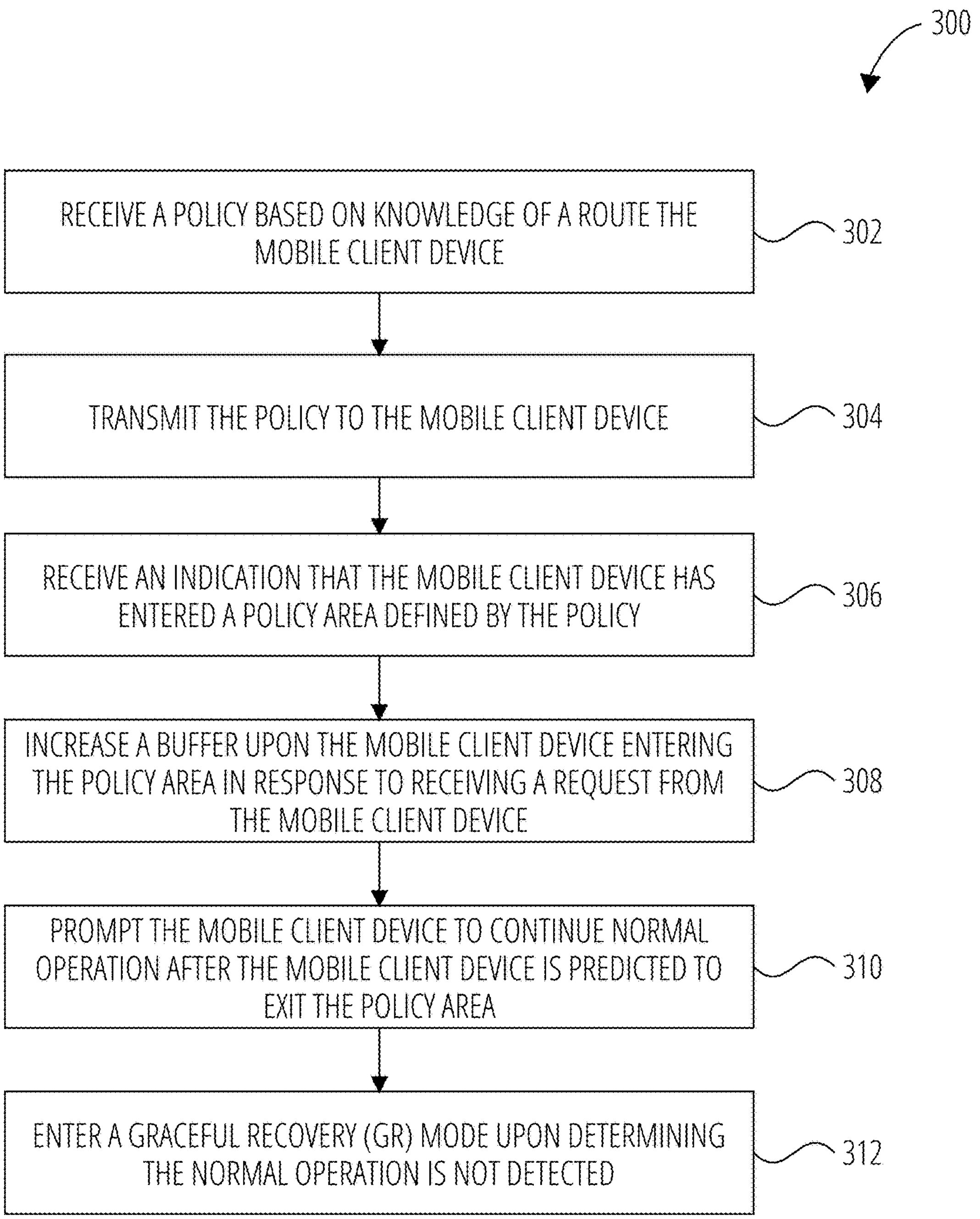
FIG. 3 illustrates an example process for managing policies on a mobile client device within a Software-Defined Wide Area Network (SD-WAN) in accordance with some examples of the disclosure.

FIG. 3 illustrates an example process 300 for managing policies on a mobile client device within a Software-Defined Wide Area Network (SD-WAN). Although the example process 300 depicts a particular sequence of operations, the sequence may be altered without departing from the scope of the present disclosure. For example, some of the operations depicted may be performed in parallel or in a different sequence that does not materially affect the function of the process 300. In other examples, different components of an example device or system that implements the process 300 may perform functions at substantially the same time or in a specific sequence.

According to some examples, the method includes receiving a policy based on knowledge of a route the mobile client device at block 302. For example, the network controller 206, as depicted in FIG. 2, may receive a policy upon detecting the movement of the mobile client device. This policy is formulated based on insights into the route of the mobile client device. The policy can comprise of one or more location-based configurations designed for deployment according to the mobile client device's position along the route.

According to some examples, the method includes transmitting the policy to the mobile client device at block 304. For example, the network controller 206 illustrated in FIG. 2 may transmit the policy to the mobile client device.

According to some examples, the method includes receiving an indication that the mobile client device has entered a policy area defined by the policy at block 306. For example, the network controller 206 illustrated in FIG. 2 may receive an indication that the mobile client device has entered a policy area defined by the policy. Based on the policy area, a first configuration is selected from one or more location-based configurations.

According to some examples, the method includes increasing a buffer upon the mobile client device entering the policy area in response to receiving a request from the mobile client device at block 308. For example, the network controller 206 illustrated in FIG. 2 may increase a buffer upon the mobile client device entering the policy area in response to receiving a request from the mobile client device. The buffer is increased for a set period, depending on the policy's implementation. The buffer can also be increased if the mobile client device is found to be within the policy area during a location check.

According to some examples, the method includes prompting the mobile client device to continue normal operation after the mobile client device is predicted to exit the policy area at block 310. For example, the network controller 206 illustrated in FIG. 2 may prompt the mobile client device to continue normal operation after the mobile client device is predicted to exit the policy area. When the predetermined time period expires, the mobile client device will be prompted to resume its normal operations. The normal operations, which include continuing one or more scheduled operations, were planned before the predetermined time period started.

According to some examples, the method includes entering a GR mode upon determining the normal operation is not detected at block 312. For example, the network controller 206 illustrated in FIG. 2 may enter a GR mode upon determining the normal operation is not detected.

Figure 4:
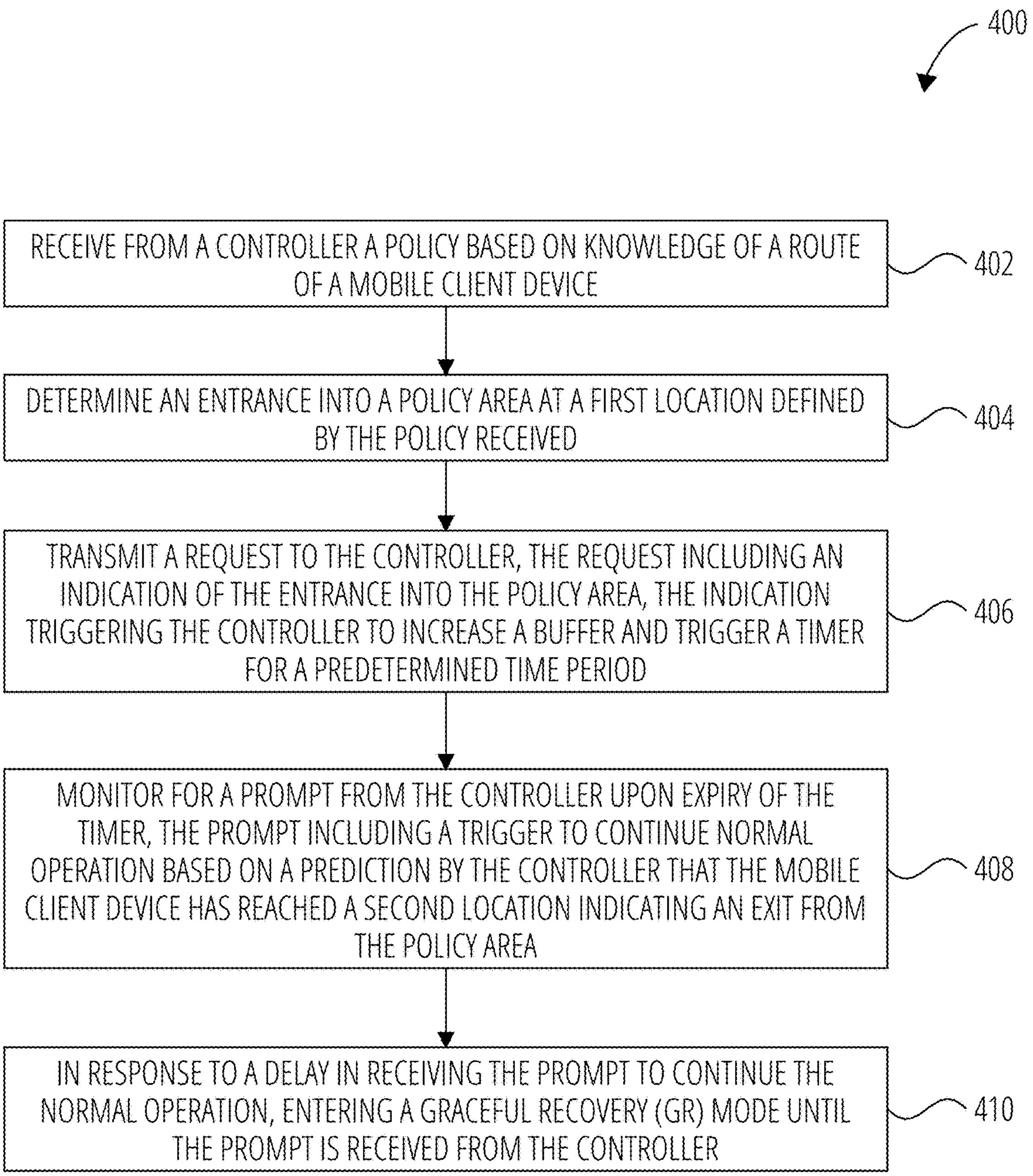
FIG. 4 illustrates an example process for a mobile client device implementing a policy while in route through a low connectivity area in accordance with some examples of the disclosure.

FIG. 4 illustrates an example process 400 for a mobile client device implementing a policy while in route through a low connectivity area. Although the example process 400 depicts a particular sequence of operations, the sequence may be altered without departing from the scope of the present disclosure. For example, some of the operations depicted may be performed in parallel or in a different sequence that does not materially affect the function of the process 400. In other examples, different components of an example device or system that implements the process 400 may perform functions at substantially the same time or in a specific sequence.

According to some examples, the method includes receiving from a controller a policy based on knowledge of a route of a mobile client device at block 402. For example, the mobile client device 212 illustrated in FIG. 2 may receive from a controller a policy based on knowledge of a route of a mobile client device.

According to some examples, the method includes determining an entrance into a policy area at a first location defined by the policy received at block 404. For example, the mobile client device 212 illustrated in FIG. 2 may determine an entrance into a policy area at a first location defined by the policy received. As shown in FIG. 2 tunnel 210 can represent a policy area that the mobile client device 212 expects to lose connectivity, and would like to avoid entering a GR mode causing a loss of normal operation.

According to some examples, the method includes transmitting a request to the controller, the request including an indication of the entrance into the policy area, the indication triggering the controller to increase a buffer, and trigger a timer for a predetermined time period at block 406. For example, the mobile client device 212 is illustrated in FIG. 2 may transmit a request to the controller, the request including an indication of the entrance into the policy are a. The indication can trigger the controller to increase a buffer and a timer for a predetermined time period.

According to some examples, the method includes monitoring for a prompt from the controller upon the expiry of the timer. The prompt includes a trigger to continue normal operation based on a prediction by the controller that the mobile client device has reached a second location, indicating an exit from the policy area at block 408. For example, the mobile client device 212 illustrated in FIG. 2 may monitor for a prompt from the controller upon expiry of the timer, the prompt including a trigger to continue normal operation based on a prediction by the controller that the mobile client device has reached a second location indicating an exit from the policy area.

According to some examples, the method includes, in response to a delay in receiving the prompt to continue the normal operation, entering a GR mode until the prompt is received from the controller at block 410. For example, the mobile client device 212 illustrated in FIG. 2 may in response to a delay in receiving the prompt continue the normal operation, avoid entering a GR mode until the prompt is received from the controller.

Figure 5:
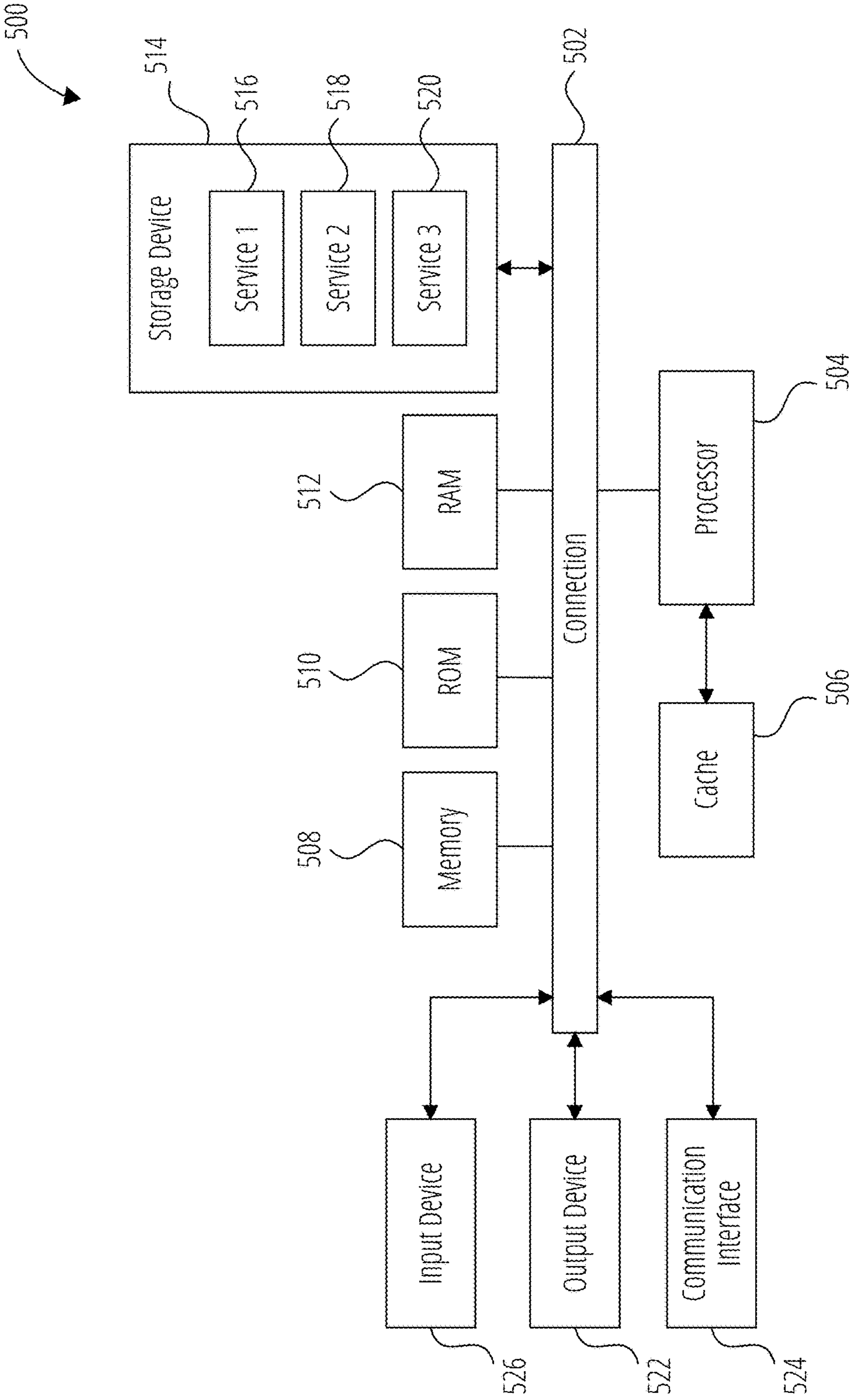
FIG. 5 illustrates an example of a computing system according to some aspects of the present technology.

FIG. 5 shows an example of computing system 500, which can be for example any computing device making up a system network, or any component thereof in which the components of the system are in communication with each other using connection 502. Connection 502 can be a physical connection via a bus, or a direct connection into processor 504, such as in a chipset architecture. Connection 502 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 500 includes at least one processing unit (central processing unit (CPU) or processor) and connection 502 that couples various system components including system memory 508, such as read-only memory (ROM) 510 and random access memory (RAM) 512 to processor 504. Computing system 500 can include a cache 506 of high-speed memory 508 connected directly with, in close proximity to, or integrated as part of processor 504.

Processor 504 can include any general-purpose processor and a hardware service or software service, such as services 516, 518, and 520 stored in storage device 514, configured to control processor 504 as well as a special-purpose processor where software instructions are incorporated into the actual processor design. Processor 504 may essentially be a completely self-contained computing system, containing multiple cores or processors, a bus, memory controller, cache 506, etc. A multi-core processor may be symmetric or asymmetric.

To enable user interaction, computing system 500 includes an input device 526, which can represent any number of input mechanisms, such as a microphone for speech, a touch-sensitive screen for gesture or graphical input, keyboard, mouse, motion input, speech, etc. Computing system 500 can also include output device 522, which can be one or more of a number of output mechanisms known to those of skill in the art. In some instances, multimodal systems can enable a user to provide multiple types of input/output to communicate with computing system 500. Computing system 500 can include communication interface 524, which can generally govern and manage the user input and system output. There is no restriction on operating on any particular hardware arrangement, and therefore the basic features here may easily be substituted for improved hardware or firmware arrangements as they are developed.

Storage device 514 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 514 can include software services, servers, services, etc., that when the code that defines such software is executed by the processor 504, it causes the system to perform a function. In some embodiments, a hardware service that performs a particular function can include the software component stored in a computer-readable medium in connection with the hardware components, such as processor 504, connection 502, output device 522, etc., to carry out the function.

For clarity of explanation, in some instances, the present technology may be presented as including individual functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in the memory of a client device and/or one or more servers of a content management system and performs one or more functions when a processor executes the software associated with the service. In some embodiments, a service is a program or a collection of programs that carry out a specific function. In some embodiments, a service can be considered a server. The memory can be a non-transitory computer-readable medium.

In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, one or more network interfaces configured to communicate and/or receive the data, any combination thereof, and/or other component(s). The one or more network interfaces can be configured to communicate and/or receive wired and/or wireless data, including data according to the 3G, 4G, 5G, and/or other cellular standard, data according to the Wi-Fi (802.11x) standards, data according to the Bluetooth™ standard, data according to the IP standard, and/or other types of data.

The components of the computing device can be implemented in circuitry. For example, the components can include and/or can be implemented using electronic circuits or other electronic hardware, which can include one or more programmable electronic circuits (e.g., microprocessors, graphical processing units (GPUs), digital signal processors (DSPs), CPUs, and/or other suitable electronic circuits), and/or can include and/or be implemented using computer software, firmware, or any combination thereof, to perform the various operations described herein.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per sc.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but may have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as RAM such as synchronous dynamic random access memory (SDRAM), ROM, non-volatile random access memory (NVRAM), EEPROM, flash memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more DSPs, general purpose microprocessors, an ASIC, FPGAs, or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Some aspects of the present technology include:

Clause 1. A method for managing policies on a mobile client device within a Software-Defined Wide Area Network (SD-WAN), the method comprising: receiving, at a controller, a policy based on knowledge of a route of the mobile client device; transmitting, by the controller, the policy to the mobile client device; receiving, from the mobile client device, an indication that the mobile client device has entered a policy area defined by the policy, the policy specifying a transition to cellular base stations within the policy area to provide connectivity for the mobile client device based on its position along the route; in response to receiving a request from the mobile client device, increasing a buffer upon the mobile client device entering the policy area; prompting the mobile client device to continue normal operation after the mobile client device is predicted to exit the policy area; and entering a graceful recovery (GR) mode upon determining the normal operation is not detected.

Clause 2. The method of clause 1, wherein the policy being received upon detection of movement of the mobile client device.

Clause 3. The method of clause 1-2, wherein a first configuration is selected from one or more location-based configurations based on the policy area, the location-based configurations configured to specify one or more cellular base stations having a connectivity above a threshold at one or more locations within the policy area.

Clause 4. The method of clause 1-3, wherein the policy comprises of one or more location-based configurations for implementation based on a location of the mobile client device along the route.

Clause 5. The method of clause 1-4, wherein the buffer is increased for a predetermined time period based on implementation of the policy.

Clause 6. The method of clause 1-5, wherein prompting the mobile client device to continue the normal operation occurs at an expiry of the predetermined time period.

Clause 7. The method of clause 1-4, wherein the buffer is increased for a predetermined time and the buffer can be increased if a check of the location maintains a position of the mobile client device as within the policy area.

Clause 8. The method of clause 1-5, wherein the normal operation including continuing one or more operations scheduled prior to initiation of the predetermined time period.

Clause 9. A method comprising: receiving from a controller a policy based on knowledge of a route of a mobile client device; determining an entrance into a policy area at a first location defined by the policy received, the policy specifying a transition to cellular base stations within the policy area to provide connectivity for the mobile client device based on its position along the route; transmitting a request to the controller, the request including an indication of the entrance into the policy area, the indication triggering the controller to increase a buffer and trigger a timer for a predetermined time period; monitoring for a prompt from the controller upon expiry of the timer, the prompt including a trigger to continue normal operation based on a prediction by the controller that the mobile client device has reached a second location indicating an exit from the policy area; and in response to a delay in receiving the prompt to continue the normal operation, avoid entering a graceful recovery (GR) mode until the prompt is received from the controller.

Clause 10. The method of clause 9, wherein the policy being received upon detection of movement of the mobile client device.

Clause 11. The method of clause 9-10, wherein a first configuration is selected from a one or more location-based configurations based on the policy area, the location-based configurations configured to specify one or more cellular base stations having a connectivity above a threshold at one or more locations within the policy area.

Clause 12. The method of clause 9-11, wherein the policy comprises of one or more location-based configurations for implementation based on a location of the mobile client device along the route.

Clause 13. The method of clause 9-12, wherein the buffer is increased for the predetermined time period based on implementation of the policy.

Clause 14. The method of clause 9-13, wherein prompting the mobile client device to continue the normal operation occurs at an expiry of the predetermined time period.

Clause 15. The method of clause 9-12, wherein the buffer is increased for a predetermined time and the buffer can be increased if a check of the location maintains a position of the mobile client device as within the policy area.

Clause 16. The method of clause 9-15, wherein the normal operation including continuing one or more operations is scheduled prior to initiation of the predetermined time period.

Clause 17. A non-transitory computer-readable medium comprising computer-readable instructions, which when executed by one or more processors of a network appliance, cause the network appliance to: receiving, at a controller, a policy based on knowledge of a route of a mobile client device, the policy specifying a transition to cellular base stations within the policy area to provide connectivity for the mobile client device based on its position along the route; transmitting, by the controller, the policy to the mobile client device; receiving, from the mobile client device, an indication that the mobile client device has entered a policy area defined by the policy; in response to receiving a request from the mobile client device, increasing a buffer upon the mobile client device entering the policy area; prompting the mobile client device to continue normal operation after the mobile client device is predicted to exit the policy area; and entering a graceful recovery (GR) mode upon determining the normal operation is not detected.

Clause 18. The non-transitory computer-readable medium of clause 17, wherein the policy being received upon detection of movement of the mobile client device.

Clause 19. The non-transitory computer-readable medium of clauses 17-18, wherein a first configuration is selected from one or more location-based configurations based on the policy area, the location-based configurations configured to specify one or more cellular base stations having connectivity above a threshold at one or more locations within the policy area.

Clause 20. The non-transitory computer-readable medium of clause 17-19, wherein the policy comprises of one or more location-based configurations for implementation based on a location of the mobile client device along the route.

Clause 21. A method for managing policies at a mobile client device within a Software-Defined Wide Area Network (SD-WAN), the method comprising: receiving an indication from a mobile client device including an intent to follow a route to a specified destination; transmitting, to the client device, a policy identified based on knowledge of the route of the mobile client device, the policy specifying a policy area where the mobile client device is to experience a loss of connectivity; receiving, from the mobile client device, a request indicating that the mobile client device has entered the policy area defined by the policy; in response to receiving the request from the mobile client device, increasing a buffer in preparation for a loss of connectivity with the mobile client device, wherein the buffer prevents the controller from entering a graceful recovery (GR) mode during the lost off connectivity; upon expiry of the timer, prompting the mobile client device to continue normal operation after the mobile client device is predicted to exit the policy area; and entering a graceful recovery (GR) mode upon determining the normal operation is not detected at the mobile client device.

Clause 22. The method of clause 21, wherein the policy is transmitted upon detection of movement of the mobile client device.

Clause 23. The method of clause 21-22, wherein the policy comprises of one or more location-based configurations for implementation based on a location of the mobile client device along the route.

Clause 24. The method of clause 21-23, wherein the buffer is increased for a predetermined time period based on implementation of the policy and an estimated loss of connectivity within the policy area.

Clause 25. The method of clause 21-24, wherein prompting the mobile client device to continue the normal operation occurs at an expiry of the predetermined time period.

Clause 26. The method of clause 21 or 23, wherein the buffer is increased for a predetermined time and the buffer can be increased if a check of the location maintains a position of the mobile client device as within the policy area.

Clause 27. The method of clause 21 or 24, wherein the normal operation includes continuing one or more operations scheduled prior to initiation of the predetermined time period.

Clause 28. A method for managing policies on a mobile client device within a Software-Defined Wide Area Network (SD-WAN), the method comprising: receiving, from a controller, a policy based on knowledge of a route of the mobile client device, the policy specifying a policy area indicating associated with a loss of connectivity; transmitting an indication to the controller that the mobile client device has entered the policy area defined by the policy; after expiry of a time period specified by the policy, receiving a prompt from the mobile client device, the prompt instructing the mobile client device to continue normal operation once the mobile client device has exited the policy area; transmitting a response to the controller verifying exit from the policy area, the response indicating to the controller that the mobile client device has resumed normal operation, wherein the controller avoid entering a graceful recovery (GR) mode.

What is claimed is:

1. A method for managing policies on a mobile client device within a Software-Defined Wide Area Network (SD-WAN), the method comprising:

receiving, at a controller, a policy based on knowledge of a route of the mobile client device;

transmitting, by the controller, the policy to the mobile client device;

receiving, from the mobile client device, an indication that the mobile client device has entered a policy area defined by the policy, the policy specifying a transition to cellular base stations within the policy area to provide connectivity for the mobile client device based on its position along the route;

in response to receiving a request from the mobile client device, increasing a buffer upon the mobile client device entering the policy area;

prompting the mobile client device to continue normal operation after the mobile client device is predicted to exit the policy area; and entering a graceful recovery (GR) mode upon determining the normal operation is not detected.

2. The method of claim 1, wherein the policy being received upon detection of movement of the mobile client device.

3. The method of claim 1, wherein a first configuration is selected from one or more location-based configurations based on the policy area, the one or more location-based configurations configured to specify one or more cellular base stations having connectivity above a threshold at one or more locations within the policy area.

4. The method of claim 1, wherein the policy comprises of one or more location-based configurations for implementation based on a location of the mobile client device along the route.

5. The method of claim 4, wherein the buffer is increased for a predetermined time period based on the implementation of the policy.

6. The method of claim 5, wherein prompting the mobile client device to continue the normal operation occurs at an expiry of the predetermined time period.

7. The method of claim 4, wherein the buffer is increased for a predetermined time and the buffer can be increased if a check of the location maintains a position of the mobile client device as within the policy area.

8. The method of claim 5, wherein the normal operation including continuing one or more operations scheduled prior to initiation of the predetermined time period.

9. A method comprising:

receiving from a controller a policy based on knowledge of a route of a mobile client device, the policy specifying a transition to cellular base stations within a policy area to provide connectivity for the mobile client device based on its position along the route;

determining an entrance into the policy area at a first location defined by the policy received;

transmitting a request to the controller, the request including an indication of the entrance into the policy area, the indication triggering the controller to increase a buffer and trigger a timer for a predetermined time period;

monitoring for a prompt from the controller upon expiry of the timer, the prompt including a trigger to continue normal operation based on a prediction by the controller that the mobile client device has reached a second location indicating an exit from the policy area; and in response to a delay in receiving the prompt to continue the normal operation, avoid entering a graceful recovery (GR) mode until the prompt is received from the controller.

10. The method of claim 9, wherein the policy being received upon detection of movement of the mobile client device.

11. The method of claim 9, wherein a first configuration is selected from a one or more location-based configurations based on the policy area, the one or more location-based configurations configured to specify one or more base stations having the connectivity being above a threshold at one or more locations within the policy area.

12. The method of claim 9, wherein the policy comprises of one or more location-based configurations for implementation based on a location of the mobile client device along the route.

13. The method of claim 12, wherein the buffer is increased for the predetermined time period based on the implementation of the policy.

14. The method of claim 13, wherein prompting the mobile client device to continue the normal operation occurs at the expiry of the predetermined time period.

15. The method of claim 12, wherein the buffer is increased for a predetermined time and the buffer can be increased if a check of the location maintains a position of the mobile client device as within the policy area.

16. The method of claim 9, wherein the normal operation including continuing one or more operations is scheduled prior to initiation of the predetermined time period.

17. A non-transitory computer-readable medium comprising computer-readable instructions, which when executed by one or more processors of a network appliance, cause the network appliance to:

receiving, at a controller, a policy based on knowledge of a route of a mobile client device;

transmitting, by the controller, the policy to the mobile client device, the policy specifying a transition to cellular base stations within a policy area to provide connectivity for the mobile client device based on its position along the route;

receiving, from the mobile client device, an indication that the mobile client device has entered the policy area defined by the policy;

in response to receiving a request from the mobile client device, increasing a buffer upon the mobile client device entering the policy area;

prompting the mobile client device to continue normal operation after the mobile client device is predicted to exit the policy area; and entering a graceful recovery (GR) mode upon determining the normal operation is not detected.

18. The non-transitory computer-readable medium of claim 17, wherein the policy being received upon detection of movement of the mobile client device.

19. The non-transitory computer-readable medium of claim 17, wherein a first configuration is selected from one or more location-based configurations based on the policy area, the one or more location-based configurations configured to specify one or more base stations having the connectivity being above a threshold at one or more locations within the policy area.

20. The non-transitory computer-readable medium of claim 17, wherein the policy comprises of one or more location-based configurations for implementation based on a location of the mobile client device along the route.

* * * * *